Feb. 8, 1944.   R. F. PARKINS   2,341,236
WINDSHIELD PROTECTOR
Filed June 15, 1942
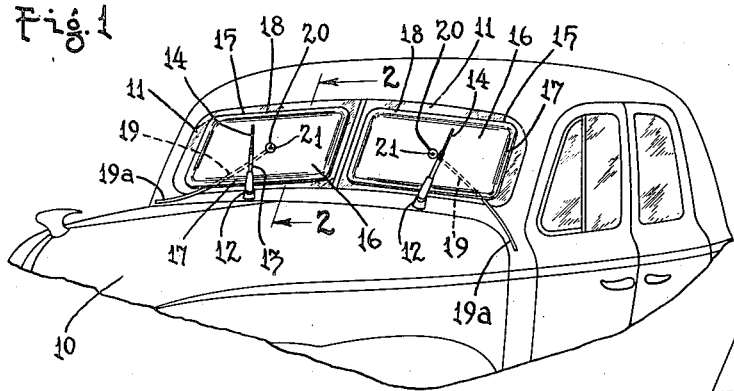
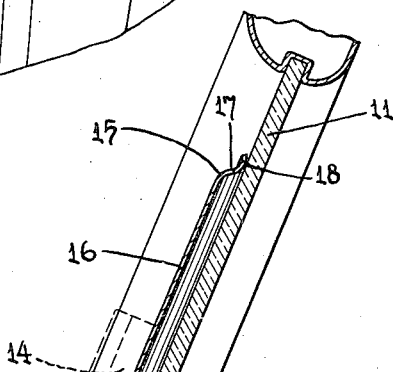
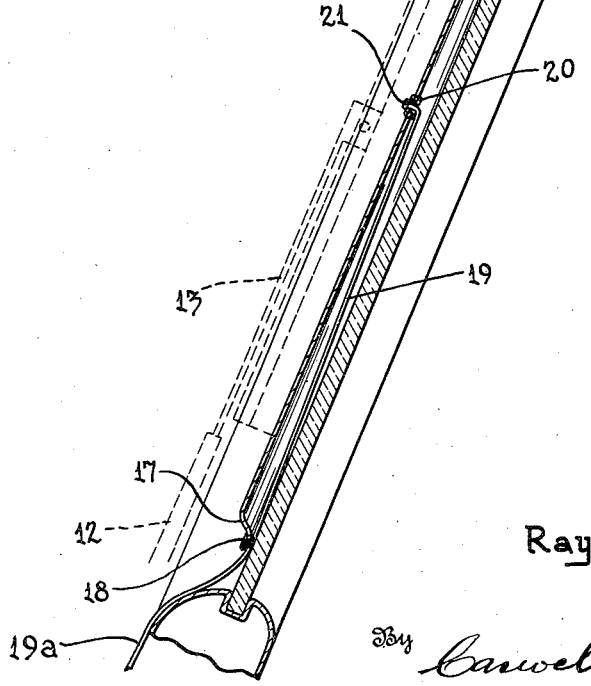
Inventor
Ray F. Parkins
By Caswell + Lagaard
Attorneys Patented Feb. 8, 1944

2,341,236

UNITED STATES PATENT OFFICE 2,341,236

WINDSHIELD PROTECTOR

Ray F. Parkins, Minneapolis, Minn.; Louis H. Schnedler, administrator of said Ray F. Parkins, deceased, assignor, by mesne assignments, to Louis H. Schnedler, Minneapolis, Minn.

Application June 15, 1942, Serial No. 447,049

4 Claims. (Cl. 296—95)

My invention relates to improvements in windshield protectors and has for an object thereof to provide a simple, durable and inexpensive shield that is quickly and easily applied to and removed from the exposed surface of the windshield of an automobile, truck, vessel, car, air craft or the like to protect the windshield against the accumulation thereon of sleet, ice, snow, mud, sand or other foreign matter, during periods when vision through the windshield is not required.

In most of the various modern means of conveyance, windshields through which the way ahead may be seen, are employed to protect the operators, and, used in connection with these windshields are wipers, the usual form whereof includes a wiper-blade, which is resiliently held against the exposed surface of its associated windshield and, in normal operation, is caused to be swept reversely across such surface to clear a predetermined sight area of the windshield from any accumulation of foreign matter that otherwise would adversely affect the operator's view therethrough.

A further object of the present invention is to supply a device of the present nature in the form of a protective panel adapted to be interposed between the outer surface of a windshield and the normally inactive wiper-blade of its associated wiper and to be releasably held by such blade against such surface.

Another object of the invention is to supply a dished shield of the instant nature formed from thin sheet material and adapted to be cupped against the face of a windshield, the dished formation of the structure imparting strength thereto and providing a limited area of contact between the same and the windshield protected thereby.

Another object of the invention is to provide a protector, as above, having incorporated therein, means for conveniently stripping the protective shield from a windshield to which it has been applied.

A further object of the invention is to provide the stripping means in the form of a cord anchored at one end thereof to the shield and having a portion thereof disposed between the shield and the surface of the windshield against which said shield is cupped.

A still further feature of the invention resides in forming the dished shield with a rolled rim so that it will have substantially line-contact with the surface of the windshield to be protected, an yet present said rim facewise, rather than edgewise, to such surface and to the stripping cord, whereby the danger of cutting or tearing the material of the rim by said stripping cord or by any other stripping medium may be minimized.

Other objects of the invention reside in the novel combination and arrangement of parts and in the details of construction hereinafter illustrated and/or described.

In the drawing, Fig. 1 is a perspective view fragmentarily illustrating an ordinary automobile and illustrating protectors, in embodiment of my invention, applied to the windshield sections of the automobile and held in place thereon by the customary windshield wipers, and Fig. 2 is an enlarged sectional view in detail taken as on the line 2—2 of Fig. 1.

Referring to the drawing, wherein similar parts are designated by similar reference characters in the different views, it will be seen that the illustrated form of my invention is shown as applied to the windshield of an automobile, which has the conventional type of windshield wipers. The automobile, designated 10 in Fig. 1, is of the ordinary pleasure type having two transparent windshield sections 11, each with a conventional type of windshield wiper 12 associated therewith. This conventional type of wiper 12 includes a resilient oscillatory arm 13 and a wiper-blade 14 attached to said arm 13, said blade 14 being yieldably held by the arm 13 against the exposed surface of its respective windshield 11 and being adapted, in the normal operation of said wiper-arm 13, to be swept back and forth across a sight area of the windshield. When the wiper 12 is not being used to perform its normal function, said wiper-arm 13 may be disposed in any position through which it swings in normal use, and the wiper-blade 14 will rest yieldingly against the surface of the windshield in such position of said arm 13.

My improved windshield protector consists principally of a shield 15 constructed from cardboard or any other suitable sheet material that is relatively stiff. The sheet material employed is stamped or otherwise formed to resolve the same into a main or body portion 16 having an inturned flange 17 at the perimeter thereof, said flange 17, along its free marginal portion, being given a transversely curved shape to provide a rolled rim 18 for the shield. This dished structure is adapted to be cupped against the surface of the windshield to be protected and its dimensions are such as to enable it to cover a substantial portion of the area brushed by the wiper-blade 14 of the wiper 12 in the normal operation thereof. With the shield 15 cupped against the windshield 11 and the rim 18 of said shield engaging the windshield surface to be kept free from the accumulation of foreign matter, the associated wiper 12 is positioned to bring its wiper-blade 14 into engagement with the body 16 of the shield. With the wiper-blade 14 thus disposed, the arm 13 of the wiper 12 is flexed more than normally and thus causes the shield 15 to be securely held by the wiper 12 against the windshield 11.

In removing the shield 15 from the windshield 11, the first step, in any case, is to swing the wiper-blade 14 out of position contacting the body 16 of said shield. If the rim 18 of the shield 15 has not been sealed to the windshield 11 by accumulated foreign matter, said shield 15 may be freely lifted or removed from the windshield surface.

The rolled rim 18, in the operative position of the shield 15, is transversely convex relative to the protected surface of the windshield, and although having substantial line-contact therewith, said rim 18 is presented facewise to such surface, rather than edgewise, as would be the case were the flange 17 to be left plain at its free margin and not transversely curved along such margin to provide the noted roll in said rim.

Should the rim 18 of said shield 15 become sealed to the windshield 11 by sleet, freezing snow or other foreign material, any simple stripping instrument, such as a knife blade, may be run along the line of contact between said rim and the windshield 11 to break the seal and free the shield 15 from the said windshield. The rim 18 being presented facewise to the windshield 11, said rim is not readily susceptible of being torn or otherwise mutilated by such stripping instrument.

My invention contemplates the employment of a special stripping medium in the form of a cord 19 which is attached at one end thereof to the body 16 of the shield 15. A simple method of attaching the cord 19 to the shield 15 is indicated in Fig. 2 of the drawing, wherein an eyelet 20 is shown as riveted to the body 16 of the shield 15, said cord 19 being threaded through said eyelet 20 and knotted, as at 21, on the outer side of said shield. The main portion of this cord 19 takes a position between the shield 15 and windshield 11. Said cord 19 is of a length to reach beyond the rim 18 of the shield 15 at all points along the perimeter of said rim, and will be extended between the rim 18 and windshield 11 with an end portion 19ª dangling in the clear and accessible to the grasp of the user in stripping the shield 15 from the windshield 11. In manipulating the cord 19 to cause it to strip the shield 15 from the windshield 11, the dangling end 19ª is grasped and led in a circular path about the perimeter of the shield, whereupon that portion of the cord 19 underlying the rim 18 cuts along the line of contact between the rim 18 and windshield 11 breaking the seal therebetween. The associated wiper 12 having been removed from engagement with the shield 15 and said shield having been thus loosened from the windshield surface by said cord 19, the shield becomes freely removable from the windshield to await the re-application thereof whenever necessity may require.

The rolled rim 18 is presented facewise to the stripping cord 19, as it is to a knife blade or other stripping medium that might be used in the absence of such cord, whereby the tearing or cutting of said rim by said cord is effectively minimized.

Constructed of any suitable sheet material and particularly of cardboard, my improved protective shield may be produced at exceedingly slight cost. It is, however, a relatively sturdy and durable structure susceptible of repeated applications and, having its own stripping medium embodied therein, said structure is highly convenient in use, even under the most trying circumstances.

While structures in embodiment of my invention will be used to protect planiform windshields associated with wipers therefor and will be held in place by such wipers, it will be understood that other suitable means may be employed to hold such protectors in place, and it will be further understood that non-planiform protectors in embodiment of my invention may be provided for windshields having non-planiform exposed surfaces to be protected against the accumulation of foreign matter.

Changes in the specific form of my invention, as herein described, may be made within the scope of what is claimed without departing from the spirit of my invention.

Having described my invention, what I claim as new and desire to protect by Letters Patent is:

1. A protector for a windshield comprising a panel of relatively stiff cardboard having an inturned flange about the perimeter of the body portion thereof and providing a dished shield, said flange being of transversely curved formation along its free margin to form a rolled rim for the structure, an eyelet secured to the body portion of said shield, a stripping cord caught at its inner end in said eyelet, said shield being adapted to be held cupped against a surface of the windshield with said rim against such surface, said cord being of a length to reach beyond said rim and being adapted to be interposed between said rim and said windshield surface, said rim being presented facewise to said cord and also to said surface and in line contact with the latter, said cord in a circular sweep about the protector being adapted by tension and shear to sever the protector from the windshield.

2. A protector for a windshield constructed of fracturable sheet material and comprising a body portion having an inturned flange about its perimeter and providing a dished shield, said flange being of transversely curved formation along its free margin to form a rolled rim for the structure, a stripping cord attached at its inner end to said body, said shield being adapted to be held cupped against the windshield with said rim against the face thereof, said cord being of a length to reach beyond said rim and being adapted to be interposed between said rim and said windshield, said rim being presented facewise to said cord and also to said surface and in line contact with the latter, said cord in a circular sweep about the protector being adapted by tension and shear to sever the protector from the windshield.

3. A protector for a windshield constructed of sheet material and comprising a shield adapted to be disposed and held against the face of said windshield and a stripping cord attached at one end to said shield at a point within the margins thereof, said cord being of a length to reach beyond the perimeter of said shield at all points therealong and being adapted to be interposed between said shield and said windshield, said cord in a circular sweep about the protector being adapted by tension and shear to sever the protector from the windshield.

4. A protector for a windshield constructed of fracturable sheet material and comprising a body portion having an inturned flange about its perimeter and providing a dished shield, said flange being of transversely curved formation along its free margin to form a rolled rim for the structure, said shield being adapted to be held cupped against a surface of the windshield to be protected with said rim thereof against such surface, said rim being presented in line contact with and facewise to said surface to enable the protector to be readily stripped therefrom without injury to said projector.

RAY F. PARKINS.